United States Patent Office 3,181,330
Patented May 4, 1965

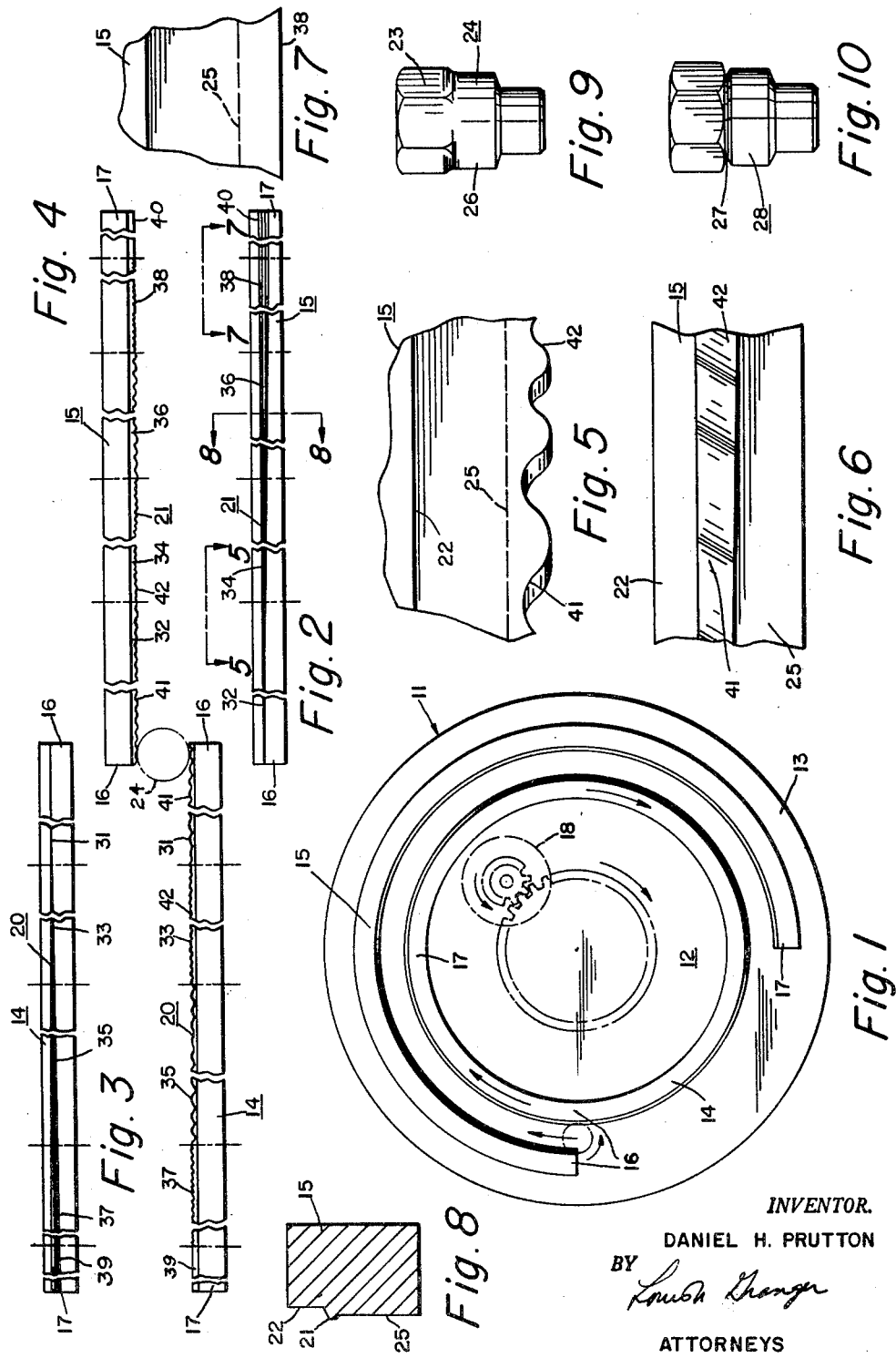

3,181,330
SWAGE FORMING MACHINE
Daniel H. Prutton, 5305 W. 130th St., Cleveland 30, Ohio
Filed Sept. 12, 1960, Ser. No. 55,267
16 Claims. (Cl. 72—90)

The invention relates in general to swage forming machines and more particularly to a machine having dies to swage form a groove in a workpiece.

Machines have previously been used to form an annular groove in a workpiece but in many cases the workpiece tends to slip relative to the dies as they try to force a displacement of the metal. In some cases a roughening of the beginning or entrance ends of the dies has been used to make certain that initially the workpiece rolls on the dies rather than slides. This method of roughening has resulted in imperfections in the workpiece and has resulted in "cold shuts" where the metal was first pierced and then rolled closed, leaving the flaw of the "cold shut."

Accordingly, an object of the present invention is to swage form a groove in a workpiece without any "cold shuts."

Another object of the invention is to form an annular groove in a workpiece which groove is relatively deep and is caused by considerable displacement of metal yet with the workpiece rolling rather than sliding relative to the dies.

Another object of the invention is to provide a grooving machine for dies with a toothed section to first form a toothed groove in the workpiece and then a smooth section to roll smooth the groove.

Another object of the invention is to provide a grooving machine having two different toothed sections of different pitch so that one toothed section forms coarse teeth and the fine-toothed section flattens the crests of the coarse teeth to change them to fine teeth.

Still another object of the invention is to provide a method of rolling a groove wherein first a toothed groove is rolled and second, a smooth groove is formed.

Still another object of the invention is to provide a grooving machine having coarse and fine toothed dies which overlap in their operation on the workpiece so that at some period of time both coarse and fine teeth are operating on the workpiece.

Other objects and a fuller understanding of this invention may be had by referring to the following description and claims, taken in conjunction with the accompanying drawings, in which:

FIGURE 1 is a plan view of two circular form dies which may incorporate the invention;

FIGURE 2 is an enlarged elevation view of the outer die;

FIGURE 3 is an enlarged elevation view of the inner die;

FIGURE 4 is an enlarged view of the two dies in the machine;

FIGURE 5 is a further enlarged plan view taken on line 5—5 of FIGURE 2;

FIGURE 6 is an elevation view of the die portion shown in FIGURE 5;

FIGURE 7 is a further enlarged plan view taken on line 7—7 of FIGURE 2;

FIGURE 8 is a further enlarged elevation sectional view taken on line 8—8 of FIGURE 2;

FIGURES 9 and 10 are elevation views of a workpiece before and after grooving.

FIGURE 1 shows an elementary machine 11 which is one of many forms the invention may take. This machine has a rotating head 12 mounted on a stationary table 13. An inner rotating die 14 is fixed in any suitable manner to the outer periphery of the rotating head 12 and an outer stationary die 15 is fixed in any suitable manner to the stationary table 13. The two dies 14 and 15 thus cooperate with each other and have entrance ends 16 and exit ends 17. The machine 11 is thus similar to circular thread rolling machines wherein a cylindrical blank is inserted at the entrance ends 16 and the dies are relatively rotated, in this case by rotating the inner die 14, and the workpiece emerges at the exit ends 17.

FIGURES 2, 3, and 4 show developed views of the dies. The rotating die 14 has a laterally extending rib 20 and the stationary die 15 has a laterally extending rib 21. The die 15 has a lengthwise recess 22 to provide clearance for a hexagonal head 23 (FIG. 9) on a workpiece 24 and the die 15 also has a lower vertical wall 25 (FIGS. 7 and 8) to engage and hold steady a lower cylindrical portion 26 on the workpiece 24. The ribs 20 and 21 are used to form a groove 27 shown in the finished workpiece 28 in FIGURE 10.

FIGURES 2 and 4 show the stationary die 15 and FIGURES 3 and 4 show the rotating die 14. The two dies are similar in construction and the rib 20 on the rotating die 14 has first, third, fifth, seventh and ninth sections 31, 33, 35, 37 and 39, respectively, extending lengthwise from the entrance end 16 to the exit end 17 thereof. Similarly, the rib 21 on the stationary die 15 has second, fourth, sixth, eighth and tenth sections 32, 34, 36, 38 and 40, respectively, extending lengthwise from the entrance end 16 to the exit end 17 thereof. As seen in FIGURE 4, the first and second sections 31 and 32 are adjaccent the entrance ends 16 and these sections have first teeth thereon shown as coarse teeth 41. The third and fourth sections 33 and 34 are next and have second or fine teeth 42. The fifth and sixth sections 35 and 36 again have coarse teeth 41 of the same pitch, and of the same pitch as the coarse teeth on sections 31 and 32. The seventh and eighth sections 37 and 38 again have fine teeth 42. The coarse pitched teeth 41 are made an even integral multiple of the fine pitched teeth 42 and preferably the ratio is 2:1. The teeth 41 and 42 may be in the order of .050 to .100 of an inch in circular pitch, and accordingly they have been omitted from FIGURE 1. In FIGURES 2 to 4, they have been exaggerated in size for clarity. As seen in FIGURE 5 which shows enlarged both the coarse and fine pitched teeth, the teeth have rounded crests and valleys with an included angle of approximately 90°. As seen in FIGURES 2 and 3 the ribs 20 and 21 gradually increase from a small vertical height to a larger vertical height from the entrance end 16 toward the exit end 17. The ninth and tenth sections 39 and 40 are smooth and have no teeth thereon. As shown in FIGURE 6, the teeth 42 and the teeth 41 as well are preferably disposed at a 30° helix angle or flute angle to the vertical.

FIGURE 4 shows that the second section 32 is preferably longer in peripheral or lengthwise extent than the first section 31. For example, the second section 32 may be 4 units of length and the first section 3 units of length. Preferably these units of length are equal to one circumference at the pitch diameter of the workpiece 24. The third and fourth sections 33 and 34 are preferably equal in length, the fifth and sixth sections 35 and 36 are preferably equal in length, and the seventh section 37 is preferably longer than the eighth section 38 by the same amount that the second section 32 is longer than the first section 31. This means that the total length of the first, third, fifth and seventh sections is substantially the same as the second, fourth, sixth and eighth sections so that a workpiece being rolled between the dies 14 and 15 enters the smooth sections 39 and 40 simultaneously. Alternatively, one of the smooth sections 39 and 40 may start acting on the workpiece ahead of the other smooth section. The dies 14 and 15 and consequently the ribs 20 and 21 converge toward each other from the entrance ends 16 to the exit ends 17.

The exact circular pitch of the coarse teeth 41, for example, is obtained by calculation to arrive at a whole number of teeth that will equal one circumference of the workpiece at the pitch diameter. A circular pitch in the order of .100 of an inch has been found satisfactory. Also the number of revolutions of the workpiece in the swaging or forming operation with a given die section is chosen as a convenient number for the proposed depth of the toothed groove to be formed by that section. From two to eight revolutions of the workpiece on a particular die section is typical, including the smooth sections 39 and 40, and three and four revolutions have been shown in the present example.

The 30° helix angle may be increased, if desired, its purpose being to insure smooth and constant meshing of the teeth on the dies and the generated teeth on the workpiece.

*Operation*

A workpiece blank 24 is inserted at the entrance ends 16 by hand or by a suitable, timed mechanism. The axis of the workpiece is vertical and thus parallel to the axis of the rotating die 14. The workpiece blank 24 may be a metal spark plug shell, for example, and if hollow a mandrel is preferably used in the hollow portion of the blank 24. The mandrel may be used to position the blank 24 at the proper height so that the ribs 20 and 21 will form the groove 27 at the proper location.

With the workpiece blank 24 at the entrance ends 16 the inner die 14 may be rotated clockwise. Accordingly, the first and second sections 31 and 32 will first operate on the workpiece. Since the beginning of the ribs is small in vertical height, the coarse teeth 41 will merely make small indentations caused by the crests of the teeth 41. Since the ribs 20 and 21 gradually converge toward each other then these coarse teeth formed in the workpiece will gradually become deeper and greater in vertical height. Preferably the workpiece will make about three complete revolutions before the first section 31 has completed its operation on the blank 24. This will be sufficient to have formed a definite coarse toothed groove in the blank 24. Next, the third section 33 will begin to cooperate with the workpiece because it overlaps the end of the second section 32 on the stationary die 15.

In this example, the second section 32 has a length equal to four circumferences of the workpiece pitch diameter, and therefore, this second section of coarse teeth will continue to exactly mesh with the previously formed coarse teeth in the workpiece, and thus will prevent any slippage between the dies and the workpiece as the fine toothed third section 33 commences operation on the workpiece. Because the fine teeth are exactly one-half the circular pitch of the coarse teeth, alternate fine teeth on section 33 will hit exactly on the crest of each previously formed coarse teeth. Thus no side pressure or thrust on the workpiece is created, which again eliminates any tendency of slippage between the dies and the workpiece. Next, after about one complete revolution of the workpiece 24, the fourth section 34 will cooperate with the third section 33 to roll a series of fine teeth in the groove. These teeth will progressively become deeper and greater in vertical height and the fine teeth on the dies will have swage formed a valley in the crest of each former coarse tooth in the workpiece. Next, for one revolution of the workpiece, the coarse tooth section 35 will begin to cooperate with the fine tooth section 34 to begin to reform coarse teeth in the workpiece. This is because of the one revolution overlap of sections 34 and 35. The continuous meshing of the fine tooth section 34 with the previously formed fine teeth on the workpiece will drive the workpiece onto the coarse teeth of section 35 without slippage. Each coarse tooth of section 35 will progressively flatten the crests of alternate fine teeth on the workpiece to begin to form coarse teeth. Next, the coarse tooth sections 35 and 36 both operate on the workpiece to form a deeper coarse tooth groove.

The next step is to again reform fine teeth, with the coarse tooth section 36 continuing to mesh with the coarse workpiece teeth to drive the workpiece onto the fine tooth section 37. This continues for one revolution and then both fine tooth sections 37 and 38 act on the workpiece to form a deeper fine tooth groove. Finally the workpiece is transferred to the smooth sections 37 and 38 which flatten the crests of these teeth and roll smooth the coarse tooth groove to form the finished groove 27 in the finished workpiece 28.

If desired, both smooth sections 39 and 40 need not start simultaneous action on the workpiece 24, instead one of the fine tooth sections 37 and 38 may be extended to help drive the workpiece onto the smooth sections. Also, four toothed sections on each die have been shown, but in some cases a fewer number may be utilized, such as only one coarse and one fine section on each die.

The machine 11 provides a means to roll a toothed groove and next a smooth groove, with the toothed groove initially preventing slippage of the dies relative to the workpiece. Also the change from coarse teeth 41 to fine teeth 42 means that a tooth crest previously formed on the workpiece is progressively flattened into a valley by the crest of a fine tooth on one die to make the groove deeper. While this occurs, there remains sufficient cogging or meshing of the workpiece and the other die to prevent any slippage. This is accomplished because section 32 overlaps both sections 31 and 33. This progressive change in the dies 14 and 15 provides a method of grooving a workpiece by progressively changing from a coarse tooth to a fine tooth and return to a coarse tooth and then to a fine tooth before smoothing out the groove. This progression permits formation of a relatively deep groove with considerable displacement of metal.

The rounded crests and valleys of the die teeth 41 and 42 make gradual and smooth indentations in the workpiece, to avoid piercing and reclosing the metal which would cause "cold shuts."

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of forming a workpiece using first and second relatively movable dies, one having first and second toothed sections of different pitch and the other having a first toothed section, said method comprising, relatively moving the dies with a workpiece between the first toothed sections to form teeth of a first circular pitch on the workpiece, and relatively moving the dies to a location thereon whereat the second toothed section on one die and the first toothed section on the other die cooperate with the workpiece to form teeth of a second circular pitch on top of the first teeth on the workpiece to roll deeper teeth in the workpiece.

2. The method of forming an annular groove in a workpiece using first and second relatively movable dies each having first and second toothed sections of different pitch and a smooth rib, said method comprising, placing a workpiece between the dies for cooperation therewith, relatively moving the dies to roll the workpiece between the first toothed sections to form teeth of a first circular pitch on the workpiece, relatively moving the dies to a location thereon whereat the second toothed section on one die and the first toothed section on the other die cooperate with the workpiece to begin to form teeth of a second circular pitch on top of the first teeth on the workpiece, relatively moving the dies to a location whereat the second toothed sections on both dies cooperate with the workpiece to roll a deeper toothed groove in the workpiece, and relatively moving the dies to a location whereat the smooth ribs thereon cooperate with the workpiece to roll a smooth groove in the workpiece.

3. The method of forming an annular groove in a workpiece using first and second relatively movable dies each having coarse and fine teeth and a smooth rib with the coarse teeth being twice the pitch of the fine teeth, said method comprising, placing a workpiece between the dies for cooperation therewith, relatively moving the dies to roll the workpiece between the coarse teeth to form coarse teeth on the workpiece, relatively moving the dies to a location whereat fine teeth on both dies cooperate with the workpiece to roll a deeper fine toothed groove in the workpiece, relatively moving said dies to a location whereat coarse teeth on both dies cooperate with the workpiece to roll a still deeper coarse toothed groove in the workpiece, and relatively moving the dies to a location whereat the smooth ribs thereon cooperate with the workpiece to roll a smooth groove in the workpiece.

4. The method of forming an annular groove in a circular workpiece using first and second relatively movable dies each having coarse and fine teeth and a smooth rib with the coarse teeth being twice the pitch on the fine teeth, said method comprising, placing a workpiece between the dies for cooperation therewith, relatively moving the dies to roll the workpiece between the coarse teeth to form coarse teeth on the workpiece, relatively moving the dies to a location thereon whereat coarse teeth on one die and fine teeth on the other die cooperate with the workpiece to begin to form fine teeth on top of the coarse teeth on the workpiece, relatively moving the dies to a location whereat fine teeth on both dies cooperate with the workpiece to roll a deeper fine toothed groove in the workpiece, relatively moving the dies to a location whereat fine teeth on said one die and coarse teeth on said other die cooperate with the workpiece to begin to reform coarse teeth on top of the fine teeth on the workpiece, relatively moving said dies to a location whereat coarse teeth on both dies cooperate with the workpiece to roll a deeper coarse toothed groove in the workpiece, and relatively moving the dies to a location whereat the smooth ribs thereon cooperate with the workpiece to roll smooth the groove in the workpiece.

5. A machine comprising, in combination, first and second dies having an entrance end and an exit end, said first die having a first section extending from said entrance end toward said exit end, said second die having a second section extending from said entrance end toward said exit end, said first and second dies gradually converging toward each other from said entrance end to said exit end, said first and second sections each having teeth, at least part of the teeth on said first die having a pitch different from the pitch of the teeth on said second die, and means for relatively moving said dies in cooperation with a workpiece therebetween at said entrance ends to first have said dies form first teeth in an annular line on any said workpiece, and secondly said dies form teeth of a different pitch.

6. A machine comprising, in combination, first and second dies having an entrance end and an exit end, said first die having first and third sections extending from said entrance end toward said exit end, said second die having second and fourth sections extending from said entrance end toward said exit end, said first and second dies gradually converging toward each other from said entrance end to said exit end, said first and second sections each having teeth, a portion of the teeth on said first die having a pitch different from the pitch of the teeth on said second die, said third and fourth sections each being smooth and having no teeth, and means for relatively moving said dies in cooperation with a workpiece therebetween at said entrance ends to first have said first and second sections form teeth in an annular line on any said workpiece, and secondly said third and fourth sections form a smooth annular portion on the workpiece.

7. A machine comprising, in combination, first and second dies having an entrance end and an exit end, said first die having first and third sections extending from said entrance end toward said exit end, said second die having second and fourth sections extending from said entrance end toward said exit end, said first and second dies gradually converging toward each other from said entrance end to said exit end, two of said sections having first teeth of the same pitch, the other two of said sections having second teeth of the same pitch, one of said first and second teeth being an integral multiple of the pitch of the other, said first section being shorter than said second section, and means for relatively moving said dies in cooperation with a workpiece therebetween at said entrance ends to first have said first and second sections from teeth in an annular line on any said workpiece, secondly said third section commences to form teeth on top of the previously formed teeth, and thirdly said fourth section cooperates with the third section and further forms deeper teeth.

8. A swaging machine comprising, in combination, first and second dies having an entrance end and an exit end, said first die having first, third and fifth sections extending from said entrance end toward said exit end, said second die having second, fourth and sixth sections extending from said entrance end toward said exit end, said first and second dies gradually converging toward each other from said entrance end to said exit end, said first and second sections each having first teeth of the same pitch, said third and fourth sections each having second teeth of pitch different from that of said first teeth, said fifth and sixth sections being smooth and having no teeth, and means for relatively moving said dies in cooperation with a workpiece therebetween at said entrance ends to first have said first and second sections swage form first teeth in an annular line on any said workpiece, secondly said third and fourth sections further swage deeper teeth, and thirdly said fifth and sixth sections swage a smooth annular portion on the workpiece.

9. A swage grooving machine comprising, in combination, first and second dies having an entrance end and an exit end, a first lateral rib on said first die, a second lateral rib on said second die, said first rib having first, third and fifth sections extending from said entrance end toward said exit end, said second rib having second, fourth and sixth sections extending from said entrance end toward said exit end, said first and second ribs gradually converging toward each other from said entrance end to said exit end, said first and second sections each having first teeth of the same pitch, said third and fourth sections each having second teeth of the same pitch, the pitch of the teeth in one of said first and third sections being an integral multiple of the pitch of the other, said teeth having rounded crests and valleys, said first section being shorter than said second section, said third section being longer than said fourth section, said fifth and sixth sections on said ribs being smooth and having no teeth, and means for relatively moving said dies in cooperation with a workpiece therebetween to first have said first and second sections swage form first teeth in an annular line on any said workpiece, secondly said third section commences to form second teeth on top of the previously formed first teeth, thirdly said fourth section meshes with the second teeth and further swages a deeper toothed groove, and fourthly said fifth and sixth sections swage a smooth groove into the workpiece.

10. A swage grooving machine comprising, in combination, first and second dies having an entrance end and an exit end, a first lateral rib on said first die, a second lateral rib on said second die, said first rib having first, third, fifth and seventh sections extending from said entrance end toward said exit end, said second rib having second, fourth, sixth and eighth sections extending from said entrance end toward said exit end, said first and second ribs gradually converging toward each other from said entrance end to said exit end, said first, second, fifth and sixth sections each having first teeth of the same pitch, said third and fourth sections each having second teeth of the same pitch, the pitch of the teeth in one of said first and third sections being half the pitch of the other, said seventh and eighth sections on said ribs being smooth and having no teeth, and means for relatively moving said dies in cooperation with a workpiece therebetween at said entrance ends to first have said first and second sections swage form first teeth in an annular line on any said workpiece, secondly said third and fourth sections mesh with the teeth and further swage a deeper toothed groove, thirdly said fifth and sixth sections mesh with the teeth to swage the toothed groove deeper, and fourthly said seventh and eighth sections swage a smooth groove into the workpiece.

11. The method of reducing the diameter of a portion of a workpiece using first and second relatively movable dies, one having a toothed section and the other having a toothed section and a smooth rib, said method comprising, placing a workpiece between the dies for cooperation therewith, a relatively moving the dies to roll the workpiece between the toothed sections to form teeth of a first circular pitch on the workpiece, and relatively moving the dies to a location thereon whereat the toothed section on one die and the smooth rib on the other die cooperate with the workpiece to begin to roll a smooth reduced diameter portion on the workpiece.

12. The method of forming an annular groove in a workpiece using first and second relatively movable dies, one having first and second toothed sections of different pitch and the other having a first toothed section and a smooth rib, said method comprising, placing a workpiece between the dies for cooperation therewith relatively moving the dies to roll the workpiece between the first toothed sections to form teeth of a first circular pitch on the workpiece, relatively moving the dies to a location thereon whereat the second toothed section on one die and the first toothed section on the other die cooperate with the workpiece to begin to form teeth of a second circular pitch on top of the first teeth on the workpiece, and relatively moving the dies to a location whereat the smooth rib on the said other die cooperates with the workpiece to begin to roll a smooth groove in the workpiece.

13. The method of forming a toothed portion in a workpiece using first and second relatively movable dies each having first and second toothed sections of different pitch, said method comprising placing a workpiece between the dies for cooperation therewith, relatively moving the dies to roll the workpiece between the first toothed sections to form teeth of a first circular pitch on the workpiece, relatively moving the dies to a location thereon whereat the second toothed section on one die and the first toothed section on the other die cooperate with the workpiece to begin to form teeth of a second circular pitch on top of the first teeth on the workpiece, and relatively moving the dies to a location whereat the second toothed sections on both dies cooperate with the workpiece to roll teeth therein of said second circular pitch.

14. A machine comprising, in combination, first and second dies, said first die having first and third sections, said second die having second and fourth sections, said first and second sections each having teeth of the same pitch, said third section having teeth of a pitch different from that of said first and second sections, said fourth section being smooth, and means for relatively moving said dies in cooperation with a workpiece therebetween to form on the workpiece first teeth of a first circular pitch from said teeth on said first and second sections, secondly to form second teeth of a second circular pitch on top of said first teeth from said teeth on said third section, and thirdly to begin to form a smooth portion on the workpiece from said smooth fourth section.

15. A machine comprising, in combination, first and second dies, said first die having first and third sections, said second die having a second section, said sections each having teeth, said first and second sections each having teeth of the same pitch, said third section having teeth of a pitch different from that of said first and second sections, and means for relatively moving said dies in cooperation with a workpiece therebetween to form on the workpiece first teeth of a first circular pitch from said teeth on said first and second sections, and secondly to form second teeth of a different circular pitch on top of said first teeth from said teeth on said second and third sections.

16. A machine comprising, in combination, first and second dies, said first die having first and third sections, said second die having second and fourth sections, said sections each having teeth, said first and second sections each having teeth of the same pitch, said third and fourth sections each having teeth of the same pitch and different from that of said first and second sections, and means for relatively moving said dies in cooperation with a workpiece therebetween to form on the workpiece first teeth of a first circular pitch from said teeth on said first and second sections, secondly to form second teeth of a different circular pitch on top of said first teeth from said teeth on said second and third sections, and thirdly to more deeply form second teeth from said teeth on said third and fourth sections.

References Cited by the Examiner

UNITED STATES PATENTS

| 151,960 | 6/74 | Dangerfield et al. | 80—18 |
| 1,496,083 | 6/24 | Browne. | |
| 2,685,806 | 8/54 | Fray | 80—7 |
| 2,705,895 | 4/55 | Batchelder | 80—7 |
| 2,755,546 | 7/56 | Moore | 29—553 |
| 2,787,828 | 4/57 | Cousino | 29—553 |

FOREIGN PATENTS 258,062   5/49   Switzerland.

MICHAEL V. BRINDISI, *Primary Examiner.*

CHARLES W. LANHAM, LEON PEAR, WHITMORE A. WILTZ, *Examiners.*